(12) United States Patent
Chang et al.

(10) Patent No.: US 8,904,006 B2
(45) Date of Patent: Dec. 2, 2014

(54) IN-FLIGHT BLOCK MAP FOR A CLUSTERED REDIRECT-ON-WRITE FILESYSTEM

(75) Inventors: Joon Chang, Austin, TX (US); Ninad S. Palsule, Beaverton, OR (US); Andrew N. Solomon, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 932 days.

(21) Appl. No.: 12/963,078

(22) Filed: Dec. 8, 2010

(65) Prior Publication Data
US 2012/0151245 A1    Jun. 14, 2012

(51) Int. Cl.
| G06F 15/173 | (2006.01) |
| G06F 15/16 | (2006.01) |
| G06F 17/30 | (2006.01) |

(52) U.S. Cl.
CPC .... *G06F 17/30227* (2013.01); *G06F 17/30088* (2013.01)
USPC ............................ 709/226; 709/203; 709/224

(58) Field of Classification Search
USPC .................................. 709/201–203, 224–226
See application file for complete search history.

(56) References Cited

U.S. PATENT DOCUMENTS

| 5,287,496 | A | 2/1994 | Chen et al. |
| 5,553,279 | A | 9/1996 | Goldring |
| 5,819,292 | A | 10/1998 | Hitz et al. |
| 5,864,849 | A | 1/1999 | Bohannon et al. |
| 6,085,197 | A | 7/2000 | Federighi et al. |
| 6,233,105 | B1 | 5/2001 | Chen et al. |
| 6,560,601 | B1 | 5/2003 | Bjornerstedt |
| 6,757,695 | B1 * | 6/2004 | Noveck et al. ............. 707/999.2 |
| 6,779,093 | B1 | 8/2004 | Gupta |
| 7,028,083 | B2 | 4/2006 | Levine et al. |
| 7,111,021 | B1 | 9/2006 | Lewis et al. |
| 7,437,360 | B1 | 10/2008 | Chitre et al. |
| 7,467,265 | B1 | 12/2008 | Tawri et al. |

(Continued)

FOREIGN PATENT DOCUMENTS

WO    2010042109    2/2010

OTHER PUBLICATIONS

Cardellini, Valeria et al., "Redirection Algorithms for Load Sharing in Distributed Web-Server Systems", *Proceedings 19th IEEE International Conference on Distributed Computing Systems* May 31-Jun. 4, 1999, 8 pages.

(Continued)

*Primary Examiner* — Minh-Chau Nguyen
(74) *Attorney, Agent, or Firm* — DeLizio Gilliam, PLLC

(57) ABSTRACT

A cluster server manages allocation of free blocks to cluster clients performing writes in a clustered file system. The cluster server manages free block allocation with a free block map and an in-flight block map. The free block map is a data structure or hardware structure with data that indicates blocks or extents of the clustered file system that can be allocated to a client for the client to write data. The in-flight block map is a data structure or hardware structure with data that indicates blocks that have been allocated to clients, but remain in-flight. A block remains in-flight until the clustered file system metadata has been updated to reflect a write performed to that block by a client. After a consistency snapshot of the metadata is published to the storage resources, the data at the block will be visible to other nodes of the cluster.

12 Claims, 11 Drawing Sheets

(56) References Cited

U.S. PATENT DOCUMENTS

| | | | |
|---|---|---|---|
| 7,526,668 B2 | 4/2009 | Shitomi et al. | |
| 7,587,429 B2 | 9/2009 | Liedes et al. | |
| 7,599,941 B2 | 10/2009 | Bahar et al. | |
| 7,610,329 B2 | 10/2009 | Bone et al. | |
| 7,617,217 B1 | 11/2009 | Chen et al. | |
| 7,640,274 B2 | 12/2009 | Tinker et al. | |
| 7,640,278 B2 | 12/2009 | Lashley et al. | |
| 7,698,289 B2 | 4/2010 | Kazar et al. | |
| 7,734,669 B2 | 6/2010 | Kottomtharayil et al. | |
| 7,747,584 B1 | 6/2010 | Jernigan, IV | |
| 7,814,118 B2 | 10/2010 | Kottomtharayil et al. | |
| 7,827,350 B1 | 11/2010 | Jiang et al. | |
| 7,840,537 B2 | 11/2010 | Gokhale et al. | |
| 7,904,434 B2 | 3/2011 | Yalamanchi et al. | |
| 7,953,706 B2 | 5/2011 | Prahlad et al. | |
| 7,984,085 B1 | 7/2011 | Aggarwal et al. | |
| 2003/0069902 A1 | 4/2003 | Narang et al. | |
| 2004/0139125 A1 | 7/2004 | Strassburg et al. | |
| 2007/0061539 A1 | 3/2007 | Nonaka et al. | |
| 2007/0179991 A1 | 8/2007 | Burnett et al. | |
| 2008/0005196 A1 | 1/2008 | Beck | |
| 2008/0256138 A1 | 10/2008 | Sim-Tang | |
| 2009/0006486 A1 | 1/2009 | Burnett et al. | |
| 2009/0240744 A1 | 9/2009 | Thomson et al. | |
| 2009/0319486 A1 | 12/2009 | Surlaker et al. | |
| 2009/0327798 A1 | 12/2009 | D'Amato et al. | |
| 2010/0125751 A1 | 5/2010 | McKean | |
| 2010/0199042 A1* | 8/2010 | Bates et al. | 711/114 |
| 2011/0078396 A1* | 3/2011 | Hiraiwa et al. | 711/162 |
| 2011/0178972 A1 | 7/2011 | Navarro et al. | |
| 2011/0238936 A1 | 9/2011 | Hayden | |
| 2012/0030265 A1 | 2/2012 | Anderson et al. | |
| 2012/0150800 A1 | 6/2012 | Adkins et al. | |
| 2012/0150804 A1 | 6/2012 | Adkins et al. | |
| 2012/0150926 A1 | 6/2012 | Adkins et al. | |
| 2012/0216074 A1 | 8/2012 | Chang et al. | |

OTHER PUBLICATIONS

Lee, Edward K. et al., "A Comparison of Two Distributed Disk Systems", *Technical Report 155, Systems Research Center, Digital Equipment Corporation* Sep. 27, 2001, 15 pages.

Panasas Inc., "Object Storage Architecture", *Panasas White Paper* Jan. 25, 2005, 24 pages.

Whitaker, Christopher et al., "Design of the Server for the Spiralog File System", *Digital Technical Journal*, vol. 8, No. 2 1996, pp. 15-31.

Cluster File Systems, Inc., "Lustre: A Scalable, High-Performance File System", Nov. 11, 2002, 13 pages.

Ellenberg, Lars "DRBD 9 & Device-Mapper Linux Block Level Storage Replication", 2008-2009, 12 pages.

Hewlett-Packard, "Veritas Storage Foundation 4.1 Release Notes", Sep. 2005, 58 pages.

U.S. Appl. No. 12/963,068, filed Dec. 8, 2010, Adkins, Janet E., et al.
U.S. Appl. No. 12/963,146, filed Dec. 8, 2010, Adkins, Janet E., et al.
U.S. Appl. No. 12/963,166, filed Dec. 8, 2010, Adkins, Janet E., et al.

Mushran, Sunil "OCFS2—A Cluster File System for Linux-Users Guide for Release 1.4", Jul. 2008, 44 pages.

Shvachko, Konstantin "The Hadoop Distributed File System", *Google/IEEE* 2010, 10 pages.

Suk, Jinsun "Snapshot-Based Data Backup Scheme: Open ROW Snapshot", *Lecture Notes in Computer Science*, vol. 5545 before INSPEC/Springer-Verlag 2009, pp. 657-666.

Symantec, "The VERITAS Cluster File System: Technology and Usage", ISBN 0-321-446100 2010, 252 pages.

Tewari, Renu "IBM Research Report—Glamour: A Wide-Area File System Middleware Using NFSv4", 2005, 15 pages.

Ungureanu, Cristian "HydraFS: a High-Throughput File System for the HYDRAstor Content-Addressable Storage System", *NEC Laboratories America* 2009-2010, 14 pages.

Veritas Software Corp., "Veritas Storage Foundation 4.0 Release Notes", Nov. 2006, 40 pages.

Weil, Sage A. "Ceph: A Scalable, High-Performance Distributed File System", http://www.ssrc.ucsc.edu/Papers/weil-osdi06.pdf (Obtained from the Internet on Jan. 4, 2011) Nov. 2006, 14 pages.

Weil, Sage "RADOS: A Scalable, Reliable Storage Service for Petabyte-Scale Storage Clusters", 2008-2009, 24 pages.

"U.S. Appl. No. 12/963,146 Office Action", Mar. 5, 2012, 17 pages.
"U.S. Appl. No. 12/963,166 Office Action", May 17, 2012, 14 pages.
"PCT Application No. PCT/EP2011/070938 International Search Report", May 10, 2012, 9 pages.

Xiao, Weijun et al., "Design and Analysis of Block-Level Snapshots for Data Protection and Recovery", IEEE Transactions on Computers, vol. 58, No. 12 Dec. 2009, pp. 1615-1625.

Zhang, Chen et al., "Supporting Multi-row Distributed Transactions with Global Snapshot Isolation Using Bare-bones HBase", 11th IEEE/ACM International Conference on Grid Computing 2010, pp. 177-184.

"U.S. Appl. No. 12/963,068 Office Action", Jul. 26, 2012, 17 pages.
U.S. Appl. No. 13/458,796, filed Apr. 27, 2012, Chang, Joon et al.
"U.S. Appl. No. 12/963,146 Office Action", Apr. 24, 2013, 20 pages.
"U.S. Appl. No. 12/963,166 Final Office Action", Aug. 13, 2012, 34 pages.
"U.S. Appl. No. 13/458,796 Office Action", Aug. 23, 2013, 32 Pages.

* cited by examiner

IN-FLIGHT BLOCK MAP FOR A CLUSTERED REDIRECT-ON-WRITE FILESYSTEM

BACKGROUND

Embodiments of the inventive subject matter generally relate to the field of file systems, and, more particularly, to clustered file systems.

File systems employ different techniques to ensure the consistency of the file system in the event of a system crash. One approach is for the file system to always write modified data to new locations on disk in a bottom-up order every few seconds. These views are called consistency snapshots. After a system crash, the file system starts with the top of the last consistency snapshot of the file system which is guaranteed to be consistent. The file system uses checksums so that data corruption can be reported to the user if the data at a given location does not match its expected checksum.

SUMMARY

Embodiments include a computer program product for allocating cluster storage units to cluster nodes for a clustered file system that implements redirect-on-write snapshotting. The computer program product comprises a computer readable storage medium having computer usable program code embodied therewith. The computer usable program code executable by a computer to cause the computer to perform operations comprising tracking cluster storage units for a clustered file system of a cluster that implements redirect-on-write snapshotting as free, in-flight, or committed. The cluster storage units comprise logical units of aggregate storage space of storage devices of the cluster. A first set of the cluster storage units are indicated as free because the first set of cluster storage units are available for allocation to nodes of the cluster. The first set of the cluster storage units are transitioned from free to in-flight to represent that the first set of cluster storage units are allocated to a client node for the client node to write to the first set of the cluster storage units. The first set of the cluster storage units are transitioned to committed to represent that data written to the first set of the cluster storage units are visible to nodes of the cluster and that checksums for the data have been recorded in metadata for the clustered file system, if a failure does not interrupt updating of the metadata for the clustered file system. The first set of the cluster storage units are returned to free if a failure occurs before at least one of updating of the metadata completes and the data written to the cluster storage units are visible.

Embodiments include a computer program product for allocating cluster storage units to cluster nodes for a clustered file system that implements redirect-on-write snapshotting. The computer program product comprises a computer readable storage medium having computer usable program code embodied therewith. The computer usable program code executable by a computer to cause the computer to perform operations comprising determining a set of cluster storage units that are free and that satisfy a number of cluster storage units in response to a request for the number of cluster storage units from a client node in a cluster that implements redirect-on-write snapshotting for a clustered file system. The set of cluster storage units are indicated as allocated to the client node and no longer free. The set of cluster storage units are then allocated to the client node.

BRIEF DESCRIPTION OF THE DRAWINGS

The present embodiments may be better understood, and numerous objects, features, and advantages made apparent to those skilled in the art by referencing the accompanying drawings.

FIG. 8 depicts a flowchart of example operations for allocating free blocks from a free block map. FIG. 9 depicts a flowchart of example operations for synchronizing an offset ordered tree part of a local free block map with the modified length ordered tree part of the local free block map. FIG. 10 depicts a flowchart of example operations for returning blocks to a free block map.

DESCRIPTION OF EMBODIMENT(S)

Figure 1:
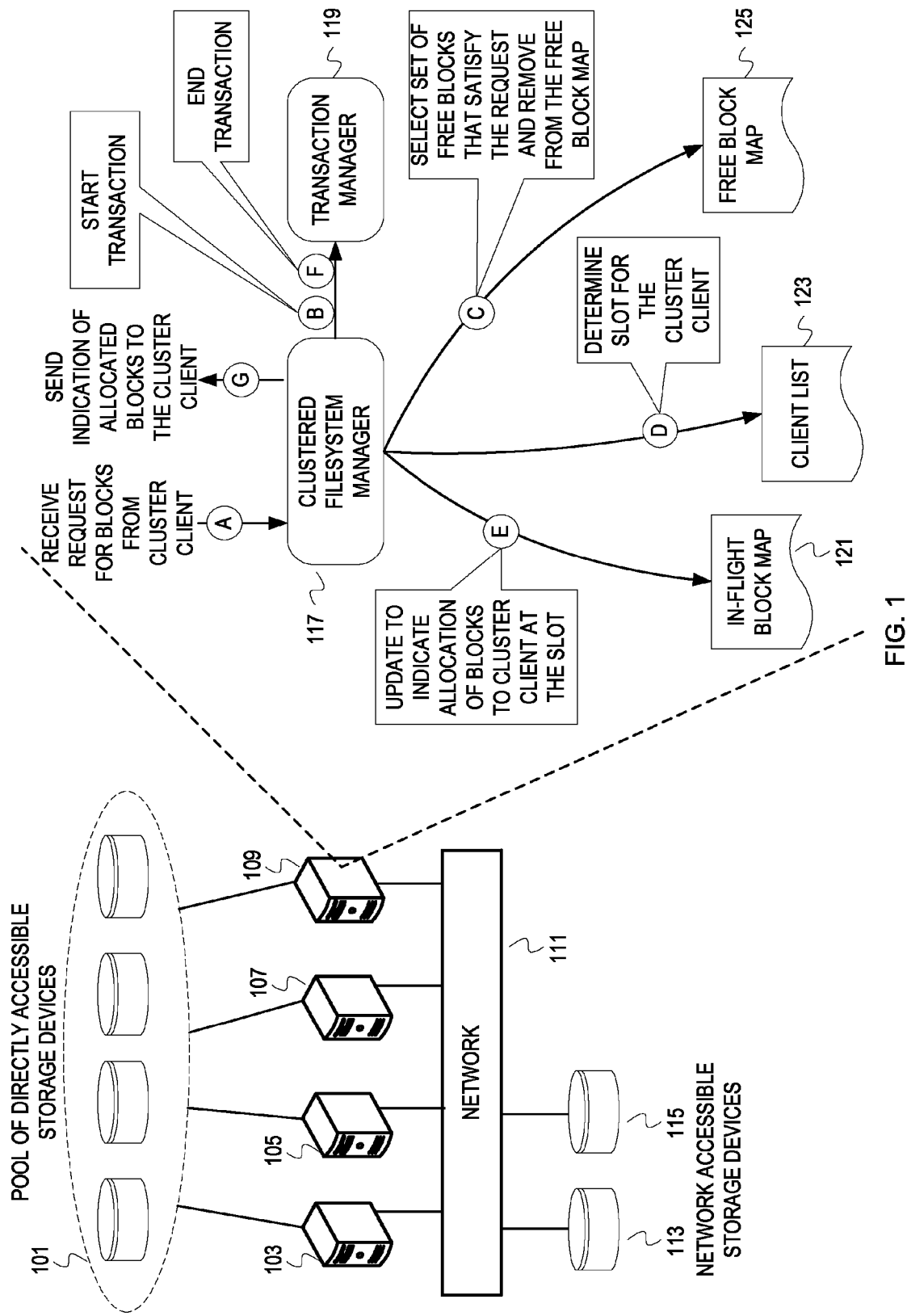
FIG. 1 depicts a conceptual diagram of a clustered file system manager allocating free blocks with an in-flight block map and a free block map.

The description that follows includes exemplary systems, methods, techniques, instruction sequences and computer program products that embody techniques of the present inventive subject matter. However, it is understood that the described embodiments may be practiced without these specific details. For instance, the description refers to checksums for examples described herein. But embodiments can be implemented with other techniques for data verification. In other instances, well-known instruction instances, protocols, structures and techniques have not been shown in detail in order not to obfuscate the description.

A cluster is formed from multiple computer systems or nodes and resources, including persistent storage resources. A clustered file system is implemented across the storage resources of a cluster. The cluster storage resources are coupled to allow direct access by the nodes of the cluster. The storage resources can be directly cabled to the nodes and/or accessible via a network (e.g., storage area network).

When a cluster is established, an administrator configures one of the nodes of the cluster to operate as a cluster leader. Embodiments can also program a cluster (i.e., code on one or more nodes of the cluster) to dynamically choose a cluster leader. The cluster leader maintains cluster role data that indicates whether a node is a client, server, both client and server. A server manages a fileset in the clustered file system. The cluster leader also maintains an indication of which node operates as a clustered file system manager. The clustered file system manager manages metadata for the clustered file system. In some embodiments, the clustered file system manager is the only server for the cluster-not accounting for a failover server. In some embodiments, the clustered file system manager delegates management of filesets within the clustered file system to other nodes that are servers. The term "fileset" is used herein to refer to a set of files and/or directories. Along with the indication of which nodes are servers within the cluster, the cluster leader can maintain an indication of the filesets managed by the servers or "fileset managers." A node within a cluster can be configured to operate as the cluster leader and the clustered file system manager. Whether a node operates as a cluster leader, server, client, etc., can be transparent to users of the cluster. A user will perceive a same behavior whether a node operates as both client and server, or the client is on a remote node.

A clustered file system manager can maintain metadata as a hierarchy of inodes for files of the clustered file system. The clustered file system metadata indicates information about logical units of storage of the clustered storage resources. The information can include location of a cluster storage unit (e.g., offset or block number) and length of an extent. In this description, the term "block" will be used to refer to a unit of cluster storage (e.g., a 4 KB block). This description will also use the term "extent" to refer to a set of contiguous blocks. When referring to a "length" of an extent, the length refers to a number of contiguous blocks that form the extent. Using these terms, a clustered file system views a pool of storage resources totaling 10 GB as 0 to 2,621,439 blocks, assuming 4 KB blocks. When a cluster client writes to logical units of cluster storage, the logical units (e.g., block numbers) are translated by a storage virtualization layer into physical locations (e.g., seek and offset) to carry out the write. Embodiments are not limited to blocks and extents, but accommodating every possible implementation for units of cluster storage (e.g., variable blocks, length in bits, etc.) would obfuscate the description.

In some embodiments, the clustered file system manager maintains the clustered file system metadata ("metadata") in a hierarchical data structure of inodes. The clustered file system manager maintains a root for the metadata a known location (i.e., predefined location) in the cluster storage resources ("cluster storage"). In a cluster that supports consistency snapshots, multiple locations in the cluster storage are reserved or defined for storing roots of consistency snapshots along with timestamps of the corresponding consistency snapshots. To recover from a failure, the clustered file system manager examines each of the locations and selects the location with the most recent timestamp to allow recovery to begin with that consistency snapshot.

In addition to maintaining the metadata, the clustered file system manager manages allocation of free blocks to cluster clients performing writes in the clustered file system. The clustered file system manager manages free block allocation with a free block map and an in-flight block map. The free block map is a data structure or hardware structure with data that indicates blocks or extents of the clustered file system that can be allocated to a client for the client to write data (e.g., create file, modify a file, etc.). The in-flight block map is a data structure or hardware structure with data that indicates blocks that have been allocated to clients, but remain in-flight. A block remains in-flight until the clustered file system metadata has been updated to reflect a write performed to that block by a client.

Allowing cluster clients to write to the cluster storage resources provides independence among the nodes within the cluster, and avoids creating a bottleneck at a cluster server. The clustered file system manager uses the in-flight block map to prevent in-flight blocks from leaking in the case of a failure of either of the cluster server or the cluster client, and allows consistent views of the clustered file system to be maintained without delaying snapshots. Updating the clustered file system metadata to reflect in-flight blocks creates a potential for an inconsistent view of the clustered file system. But delaying snapshots until an in-flight block transitions to being ready for addition to the clustered file system metadata is undesirable. If the in-flight blocks are not tracked, then a block could be considered free by a recovering cluster server after already being allocated to a cluster client, or blocks could fall lost to in-flight status if the cluster client and the cluster server fail.

FIG. 1 depicts a conceptual diagram of a clustered file system manager allocating free blocks with an in-flight block map and a free block map. The depicted cluster comprises nodes 103, 105, 107, 109. The cluster also comprises pool 101 of directly accessible storage devices; network accessible storage devices 113, 115; and network infrastructure 111. Nodes 103, 105, 107, 109 communicate via network infrastructure 111. Nodes 103, 105, 107, 109 access storage device pool 101 via cables and access network accessible storage device 113, 115 via network 111.

In the depicted cluster, node 109 has been configured as the clustered file system manager for the cluster. In other words, node 109 executes code that implements clustered file system manager functionality. The executing instance of clustered file system manager code is depicted as clustered file system manger 117. Node 109 also hosts an executing instance of transaction manager code depicted as transaction manager 119. FIG. 1 depicts a set of stages to illustrate example operations performed by clustered file system manager 117 and transaction manager 119 when allocating a free block(s) to a cluster client. In this example, nodes 103, 105, 107 operate as cluster clients.

At a stage A, clustered file system manager 117 receives a cluster client request for blocks. A cluster client request indicates a fileset being targeted, and a number of blocks to satisfy a write operation(s) to be performed by the cluster client. The cluster client can communicate the fileset with inode information, and can communicate the amount of storage resources desired with number of blocks.

At a stage B, clustered file system manager 117 informs transaction manager 119 that clustered file system manager 117 is starting transaction of allocating blocks to a cluster client. Transaction manager 119 records each operation for the transaction in a log that can be replayed upon recovery from a failure. Each of the constituent operations of a transaction is not considered performed until the transaction completes. The transaction mechanism is used to ensure atomicity of allocating free blocks. The atomicity provided by transactions avoids data corruption and inconsistent views of the clustered file system. Embodiments are not required to implement transactions and/or a transaction manager. Clustered file system manager 117 will inform transaction manager of each operation performed to allocate the free block(s) to the requesting cluster client.

At a stage C, clustered file system manager 117 selects a set of free blocks that satisfy the request from free block map 125. Clustered file system manger 117 removes the selected free blocks from free block map 125.

At a stage D, clustered file system manager 117 determines a slot for the requesting cluster client with client list 123. Client list 123 indicates which nodes are clients of node 109. When a cluster client first makes a request of node 109, a node identifier (e.g., node name, network address, etc.) of the requesting cluster client is recorded in client list 123. The third requesting cluster client will be recorded in the third slot of client list 123. Client list 123 is used to select a corresponding entry or slot in in-flight block map 121. Embodiment can maintain a client list in volatile memory of a node, but not include the client list in consistency snapshots or otherwise not flush the client list to persistent storage.

At stage E, clustered file system manager 117 updates in-flight block map 121 to indicate allocation of the blocks to the requesting cluster client. To indicate allocation of the block or transition of the blocks from free to in-flight, file system manager 117 records the block numbers at the slot of the requesting cluster client corresponding to the slot in client list 123. For example, if the requesting cluster client is indicated in a third slot or entry of client list 123, then the allocated blocks are recorded at slot or entry three of in-flight block map 121. Embodiments can identify allocated blocks with offset and length or block numbers. In addition, embodiments are not limited to maintaining a correspondence between entries in an in-flight block map and a client list. Embodiments can employ other techniques to track which cluster clients have been allocated blocks.

At stage F, file clustered file system manager 117 informs transaction manager 119 that the transaction of allocating blocks has completed.

At stage G, clustered file system manager sends an indication of the allocated blocks to the requesting cluster client. Embodiments can delay ending the transaction until after stage G or until after an acknowledgement is received from the requesting cluster client.

With the allocated blocks, a cluster client performs a write(s) to the blocks. For example, the cluster client writes a file with a modification to the set of blocks. The cluster client also generates checksums for the data written to the set of blocks. In some embodiments, the cluster client generates a checksum for the data in each of the set of blocks. In some embodiments, the cluster client generates a checksum for data in each extent to which the cluster client writes (i.e., the cluster client generates a checksum for data in an extent that spans multiple contiguous blocks).

Figure 2:
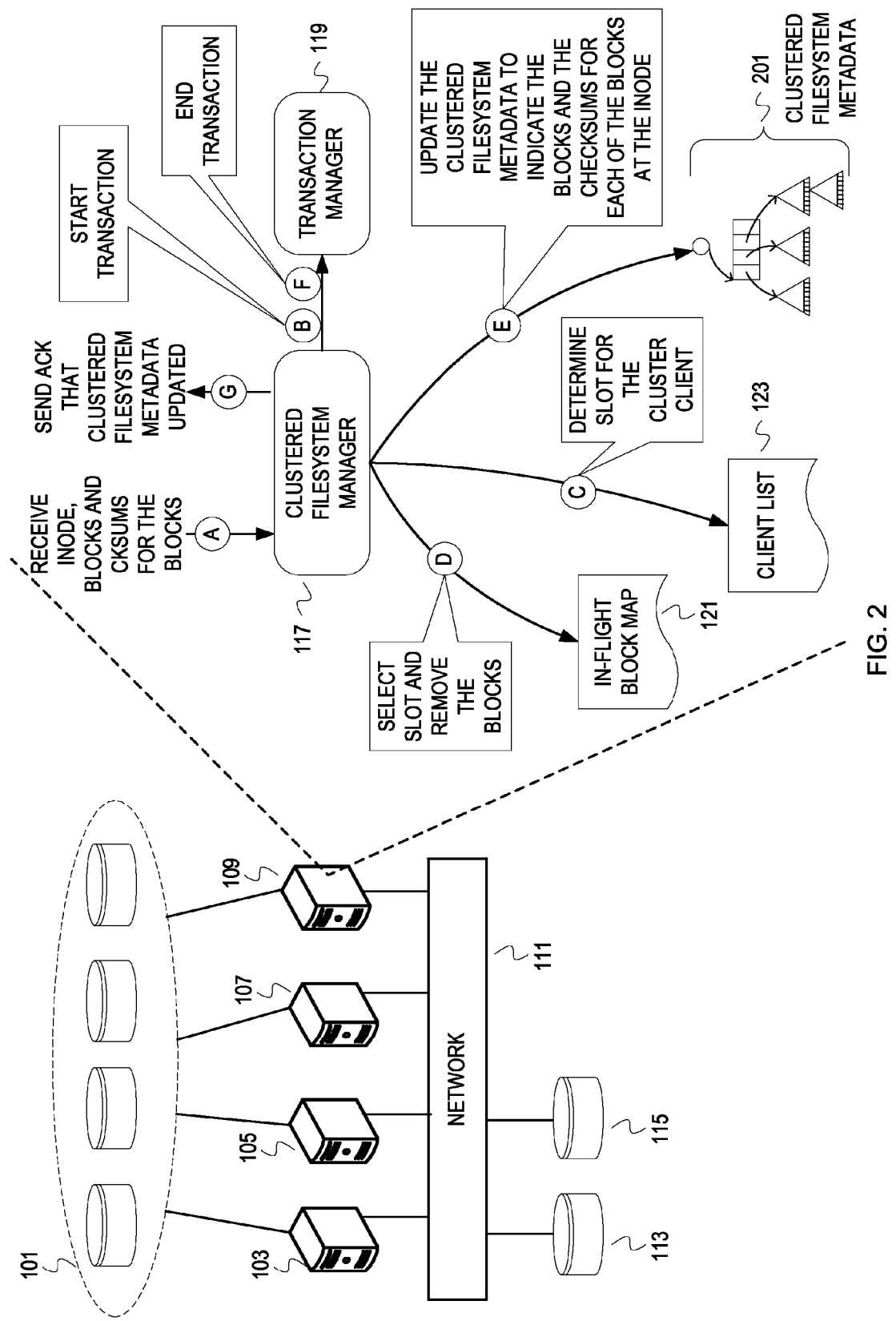
FIG. 2 depicts a conceptual diagram of the example clustered file system manager committing a cluster client write to clustered file system metadata.

FIG. 2 depicts a conceptual diagram of the example clustered file system manager committing a cluster client write to clustered file system metadata. In FIG. 2, a cluster client of node 109 sends a communication to node 109 indicating a fileset, a set of blocks to which the cluster client has written, and corresponding checksums at a stage A. The cluster client can indicate the fileset with an inode identifier. The cluster client can indicate the set of blocks with a set of corresponding block identifiers or with an offset and length for an extent. Embodiments can use extent based checksums or block based checksums.

At a stage B, clustered file system manager 117 informs transaction manager 119 that clustered file system manager 117 is starting a transaction to commit a write by a cluster client to the clustered file system metadata. Transaction manager 119 updates the transaction log accordingly to indicate start of the transaction.

At a stage C, clustered file system manager 117 determines a slot for the cluster client in client list 123. As previously stated with reference to FIG. 1, the client list either already has recorded an identifier for the cluster client or records an identifier of the cluster client in an available slot of client list 123.

At stage D, clustered file system manager 117 selects a slot in in-flight block map 121 that corresponds to the slot determined at stage C. Clustered file system manager 117 updates the selected slot to remove the indicated set of blocks. The cluster client may still be writing to other blocks, so the selected slot may still indicate those other blocks.

Figure 3:
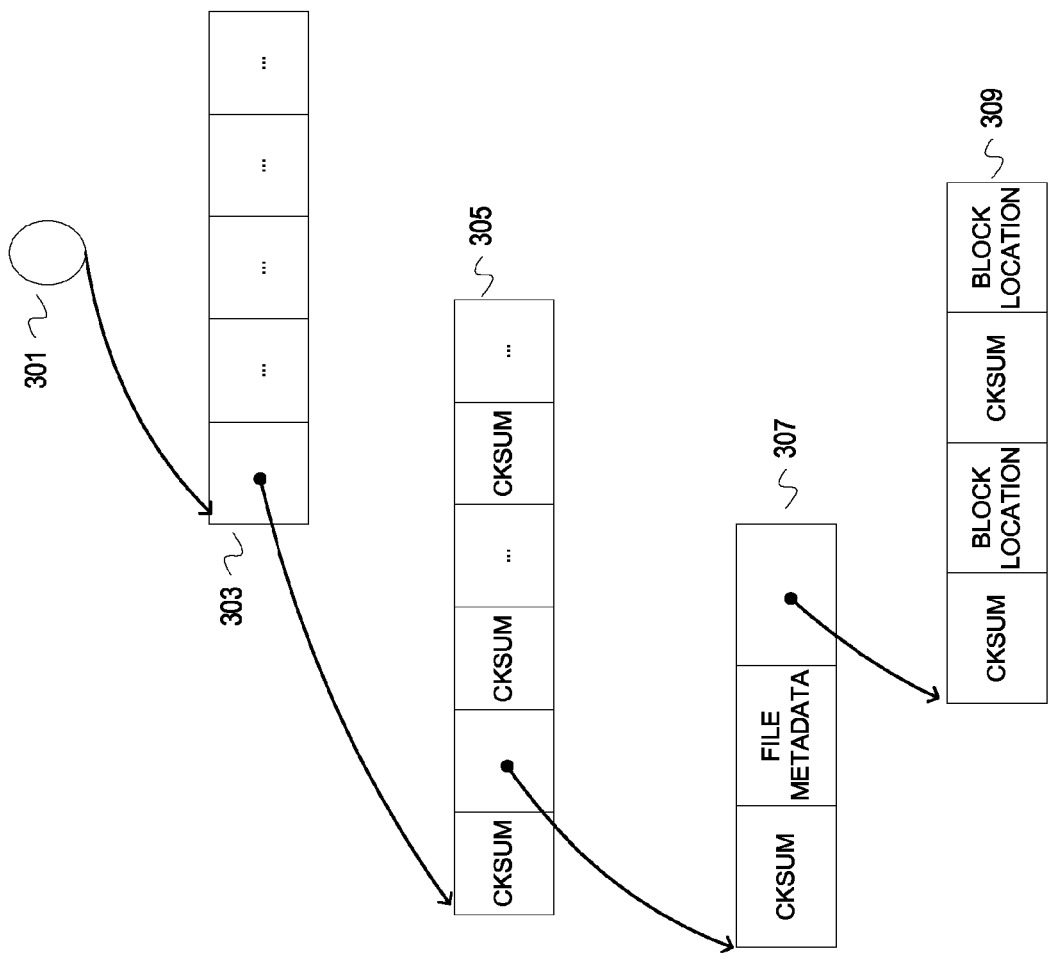
FIG. 3 depicts a portion of an example hierarchical clustered file system metadata.

At stage E, clustered file system manager 117 updates clustered file system metadata 201 to reflect transition of the blocks from in-flight to committed. The transition to committed involves adding the checksums, offset, and extent length to clustered file system metadata 201. Clustered file system metadata 201 is depicted as a hierarchy of inodes. A root references an array of pointers to inodes or extent trees, each of which are represented by triangles in FIG. 2. Clustered file system manager 117 traverses clustered file system metadata 201 to update the appropriate inodes with the checksums and to mark interior inodes as dirty since the clustered file system implements redirect on write. Various techniques can be employed to mark interior nodes as dirty. FIG. 3 will be used to more clearly illustrate an example traversal.

FIG. 3 depicts a portion of an example hierarchical clustered file system metadata. A clustered file system manage accesses the hierarchical clustered file system metadata via root 301 to commit a write(s) of a cluster client. Committing the write involves the clustered file system manager modifying an inode(s) into the hierarchical clustered file system metadata with the checksums. If the cluster client created a file, then the clustered file system manager inserts an inode into the hierarchical clustered file system metadata. This hierarchical clustered file system metadata exists in volatile memory of a node operating as the clustered file system manager. The clustered file system manager follows the root to array of pointers 303. Array of pointers 303 comprises a set of pointers, each of which point to an inode. An inode may correspond to a fileset or a file. In this example, the clustered file system manager follows a first pointer of array 303 to data structure 305 that represents a fileset that includes the file modified by the cluster client. Data structure 305 corresponds to a top of a fileset inode. Data structure 305 comprises checksums and pointers. Each of the pointers of data structure 305 points to a file inode. Each of the checksums of data structure 305 corresponds to data pointed to by the respective ones of the pointers. The checksums in array 305 are generated by the clustered file system manager when the clustered file system manager updates the inodes referenced by the pointers of array 305.

The clustered file system manager follows a first pointer of data structure 305 to data structure 307. Data structure 307 represents a part of a file inode. Data structure 307 comprises a checksum for data referenced by a pointer of data structure 307. Data structure 307 also comprises metadata for a file (e.g., permissions, size, ownership, etc.). The checksum of data structure 307 is also generated by the clustered file system manager 117 based on content of data structure 309. Data structure 309 represents another part of the file inode partially represented by data structure 307. The clustered file system manager replaces the data in data structure 309 to indicate the set of blocks and corresponding checksums from the cluster client. Embodiments may maintain multiple versions of the data in case a consistency snapshot has not finished publishing before cluster client changes a data block.

Now the clustered file system manager walks back up the hierarchical clustered file system metadata to update each data structure along the path to data structure 309. For instance, the clustered file system manager updates the file metadata in data structure 307 to reflect a change in size of the file. The clustered file system manager also generates a new checksum for data structure 307 based on the new block locations and checksums in data structure 309. Since the clustered file system implements redirect-on-write, the clustered file system manager writes the new file metadata and new checksum to new block locations, which involves allocating free blocks from the free block map. The clustered file system manager propagates the changes to new locations as it walks back up the hierarchical clustered file system metadata.

When a consistency snapshot is taken of the hierarchical clustered file system metadata, the hierarchical clustered file system metadata is flushed or published to persistent storage from bottom to top. When the publication process reaches the root, the root is written to a known location along with a time stamp.

After clustered file system manager 117 update hierarchical clustered file system metadata 201 with the new metadata (e.g., extent offsets and lengths) and checksums (e.g., extent checksums), clustered file system manager 117 notifies transaction manager 119. Transaction manager 119 records that the transaction ends and commits the transaction.

At a stage G, the clustered file system manager 117 sends an acknowledgement to the cluster client that the clustered file system metadata has been updated. Embodiments may not end the write commit transaction until either after the acknowledgement is sent or until after cluster client confirms receipt of the acknowledgement. Although FIGS. 1 and 2 depict a transaction manager used to enforce atomicity in the system, the remaining description does not refer to transactions or a transaction manager. Although embodiments can use a transactional paradigm to enforce atomicity of various tasks (e.g., allocating blocks, returning blocks to free state, promoting a node to become a server, etc.), embodiments can use different techniques for reliability and recovery. In addition, embodiments are not limited to requiring clients to generate checksums as described with reference to FIGS. 1-2.

The utility of the in-flight block map becomes more apparent when considering crash scenarios. While blocks are in-flight, either or both of the server and client can fail. Several operations take place during recovery of a server or responsive to client failure. Whether a new server assumes responsibility of the failed server or the failed server recovers, the in-flight map is used to recover and restore in-flight blocks. If a client fails, the in-flight block map is used to ensure the integrity of in-flight blocks.

Figure 4:
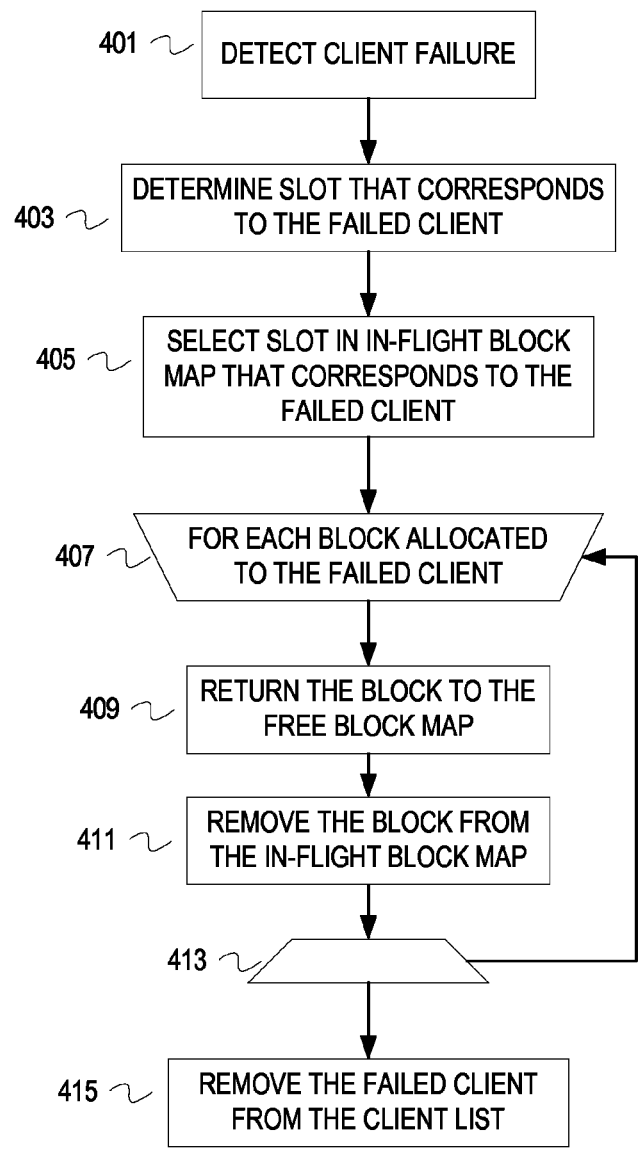
FIG. 4 depicts a flowchart of example operations for recovering in-flight blocks responsive to a cluster client failure.

FIG. 4 depicts a flowchart of example operations for recovering in-flight blocks responsive to a cluster client failure. At some point in time during operations of a cluster, a cluster client can fail ("crash"). A clustered file system manager detects the client failure (401). A cluster server (or cluster servers) can learn of a cluster client failure with a variety of mechanisms (e.g., failure of a cluster client to respond to a query within a time period, lack of a heartbeat message, etc.).

A slot in a client list that corresponds to the failed client is determined (403). For example, a cluster server looks up an identifier of the failed client and determines that the failed client identifier occupies a second slot or entry in a client list.

A slot in an in-flight block map is selected that corresponds to the slot determined to correspond to the failed client (405). For example, a cluster server selects a second record or slot in the in-flight block map after determining that the identifier of the failed client occupies the second slot in the client list.

A failed client may have been allocated several blocks. Thus, the selected slot can indicate multiple in-flight blocks as having been allocated to the failed client. For each of those blocks, a cluster server performs operations to return the in-flight block to a free state (407). Each block that was allocated to the failed client is returned to a free block map maintained by the cluster server (409). Returning the block to the free block map allows the server to allocate the block to a different cluster client or to the recovered cluster client. Regardless of the ultimate consumer, data residing at the recovered block is prevented from being visible or usable by the cluster since the cluster client failed before the block was committed to the clustered file system metadata. Each of the blocks is also removed from the in-flight block map (411).

After all of the blocks allocated to the failed client have been recovered from the in-flight state to the free state (413), the client list is updated to remove the failed client (415). In this example implementation, the corresponding slots in the client list and the in-flight block map are now vacant for another cluster client. As stated previously, embodiments are not limited to tracking cluster clients with a client list.

Figure 5:
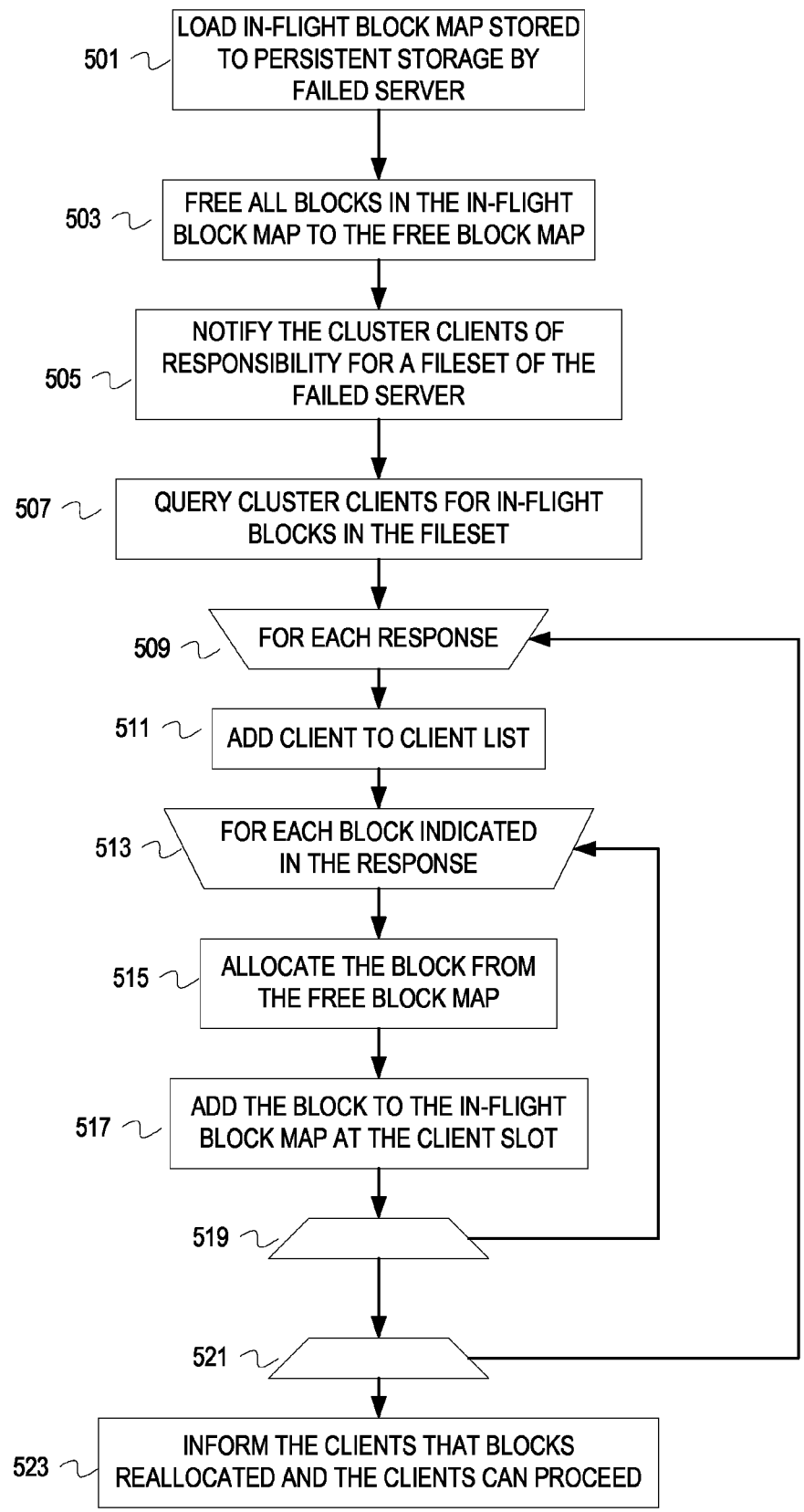
FIG. 5 depicts a flowchart of example operations for rebuilding an in-flight block map after a server fails.

FIG. 5 depicts a flowchart of example operations for rebuilding an in-flight block map after a server fails. When a cluster server fails, another node in the cluster assumes the duties of the failed server ("succeeding server"). An administrator may have previously configured the node as a backup for the failed server. Or the cluster can automatically elect another node to the be succeeding node. In a cluster with multiple cluster servers, one of which is the clustered file system manager, the clustered file system manager can select the node that assumes the duties of the failed server. The selected node may already manage a fileset (i.e., may already be a fileset manager), or the clustered file system manager can promote the node from cluster client to cluster server. To promote the node, the clustered file system manager sends a message or notification to the node that causes the node to execute fileset manager program code. While a cluster server operates, consistency snapshots are created and published to the cluster storage. The consistency snapshot includes the in-flight block map and the free-block map. The succeeding server loads the most recent consistency snapshot of the failed server, which includes an in-flight block map, into memory (501).

All of the blocks in the in-flight block map loaded from the last consistency snapshot are freed to the free block map, which was also loaded from the last consistency snapshot (503). Embodiments may not include data that tracks clients of a server in the consistency snapshots. Excluding the client list from the consistency snapshots allows a server to be independent of the identification scheme used for the nodes and reduces the amount of data maintained by a cluster server. Excluding the client list from consistency snapshots or another persistent storage based recovery mechanism, however, will forego information that matches blocks in the in-flight block map with clients. Thus, the in-flight blocks are returned to a free state.

The succeeding server notifies the cluster clients that the succeeding server now manages a fileset(s) previously managed by the failed server (505). For instance, the succeeding server broadcasts a server message to cluster clients that indicates a fileset foo. The cluster clients are now aware of the succession, and can locally store an indication that the succeeding server manages fileset foo. At this point, the cluster clients can submit requests relevant to the fileset foo to the succeeding server. The succeeding server can start allocating blocks to cluster clients. Embodiments may also transmit a message from the succeeding server to a cluster leader to notify the cluster leader of the change in responsibility for fileset foo. Embodiments may also notify the cluster leader of the change in responsibility at the time of selection or promotion.

The succeeding server queries the cluster clients for in-flight blocks allocated to them (507). Clients with in-flight blocks allocated from the failed server can be in any of a variety of stages of their write operations. A client may still be writing to the in-flight blocks. A client may have failed a write operation after not receiving an acknowledgement from the failed server within a given time period. Those clients that still have in-flight blocks (e.g., clients that have not crashed, clients that have not failed their write operations, etc.) respond to the succeeding server with indications of the client, the file or inode, and a list of allocated in-flight blocks.

For each response (509), the succeeding server rebuilds a client list, and updates the free block map and the in-flight block map. The succeeding server adds each new client identifier from the responses to the client list (511). The succeeding server updates the free block map and the in-flight block map for each block indicated in each response (513). The succeeding server allocates each indicated block from the free block map (515). The succeeding server then adds the allocated block to the in-flight block map (517). After all blocks indicated in a response have been processed by the succeeding server (519), the succeeding server processes the next response.

After all responses have been processed (521), the in-flight block map has been restored, and the succeeding server informs the responding clients that the blocks have been reallocated to the clients (523). At this point, the clients can proceed with the write operations for those reallocated blocks. The in-flight block map may not be completely restored to the state when the server failed due to possible interim events, but the in-flight block map is restored to be consistent with the current state of the active clients.

The tracking of in-flight blocks allows cluster clients to write to cluster storage, which avoids encumbering a cluster server with client write tasks. Although tracking in-flight blocks can be useful in a centralized cluster or a distributed cluster (i.e., distributed fileset management), distributing fileset management tasks to multiple nodes in a cluster avoids client contention at a single server of the cluster for free blocks. Client contention at the clustered file system manager for free blocks can reduce the independence of the cluster clients. In a clustered file system that implements redirect on write, free block allocations to clients can be frequent. Hence, delegation of fileset management preserves the independence of the cluster clients and reduces the impact of a node failure on the cluster.

In a cluster that distributes fileset management, fileset managers will maintain a free block map and an in-flight block map to allocate blocks to clients writing to a relevant fileset. The clustered file system manager delegates management of filesets in the clustered file system to nodes, which causes the nodes to operate as fileset managers. The clustered file system manager can promote a cluster client to be a fileset manager responsible for managing a fileset. For example, the clustered file system manager can determine that a given node most frequently accesses (or first accesses) a fileset or filesets. The file system manager can confirm that the given node satisfies minimal performance criteria for promotion to a fileset manager. Operating as a fileset manager involves the node managing free block allocation for cluster clients that write to the fileset and managing the metadata for the fileset. Since the clustered file system manager manages the initial free block map for the cluster ("cluster free block map"), which is created based on the storage resources of the entire cluster, the clustered file system manager provisions free blocks to fileset managers from the cluster free block map. The amount of provisioned free blocks can be configured, and can dynamically adapt to conditions of the cluster. The fileset manager then allocates free blocks from the provisioned free blocks to cluster clients that write to the fileset managed by the fileset manager.

Figure 6:
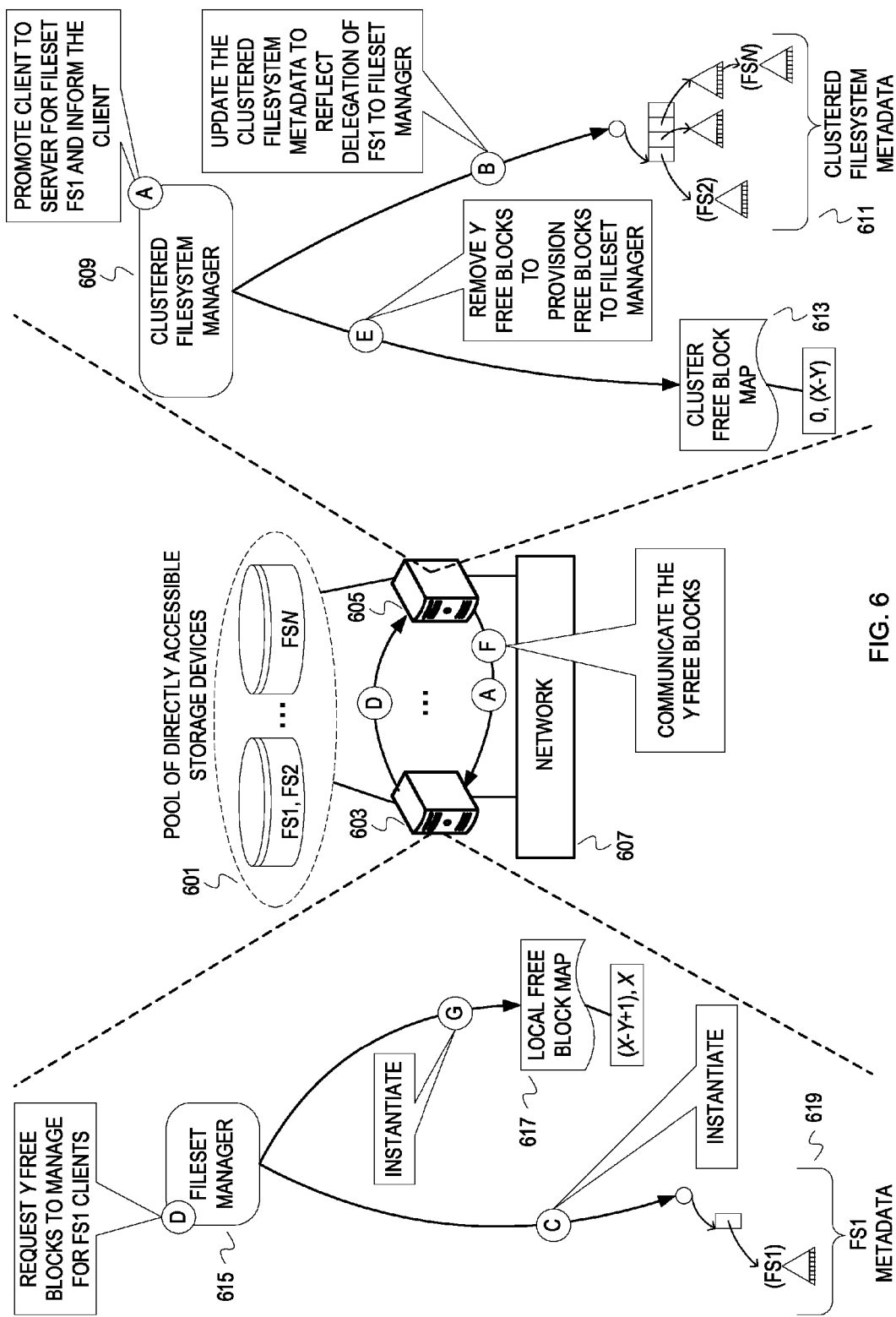
FIG. 6 depicts a conceptual diagram of a clustered file system manager delegating management responsibility for a fileset to a node of a cluster.

FIG. 6 depicts a conceptual diagram of a clustered file system manager delegating management responsibility for a fileset to a node of a cluster. A cluster comprises multiple nodes, including node 603 and node 605. The nodes of the cluster communicate via network 607. The cluster also comprises pool 601 of directly accessible storage devices. A storage device can host one fileset or multiple filesets. In addition, a fileset can span multiple storage devices. In this illustrated example, one of the storages devices in pool 601 host fileset FS1 and FS2. Another storage device in pool 601 hosts fileset N. In this example illustration, node 605 is operating as the clustered file system manager for the cluster.

Node 605 hosts an executing instance of clustered file system manager program code. FIG. 6 depicts the executing instance of the clustered file system manager program code as clustered file system manager 609. At a stage A, the clustered file system manager promotes a cluster client (node 603) to be a server or fileset manager for the fileset FS1, and informs node 603 of the promotion. Promoting a client to become a server or fileset manager comprises clustered fileset manager 609 sending a notification or message to node 603 that indicates the fileset FS1 and causes node 603 to execute fileset manager program code. In another scenario, node 603 may already be operating as a fileset manager. In that case, clustered fileset manager communicates with node 603 to inform node 603 that fileset FS1 is being delegated to node 603 in addition to whatever fileset or sets node 603 already manages. Indicating the fileset to be managed by node 603 can comprise clustered file system manager 609 providing the metadata relevant to fileset FS1 to node 603 with a message or series of messages. Embodiments can also utilize remote procedure calls, cloning, etc., for a fileset manager to obtain metadata for a fileset.

In response to being informed of the promotion, node 603 activates fileset manager functionality (e.g., executes fileset manager program code). Again, in some cases, a node may already be operating as a fileset manager. In FIG. 6, an executing instance of fileset manager program code is depicted as fileset manager 615. At a stage B, clustered file system manager 609 updates clustered file system metadata 611 to reflect delegation of fileset FS1 to fileset manager 615. In the example illustration of FIG. 6, clustered file system metadata 611 is depicted with annotations to indicate filesets represented in clustered file system metadata 611. Inodes of clustered file system metadata 611 are annotated with FS2 and FSN to represent inodes for those fileset in clustered file system metadata 611. The fileset FS1 is no longer represented in clustered file system metadata 611. Embodiments can remove a portion of the clustered file system corresponding to fileset FS1. With information from clustered file system manager 609, fileset manager 605 creates or instantiates fileset metadata 619 for fileset FS1 at a stage C. Node 603 is now responsible for maintaining metadata for fileset FS1. When a cluster client consults the cluster leader for identity of a node managing fileset FS1, the cluster leader will indicate node 603 in response. The cluster client will locally store an association of node 603 and fileset FS1 for subsequent operations on fileset FS1. In some embodiments, the clustered file system manager can maintain an indication of a fileset manager in the clustered file system metadata instead of metadata for a delegated fileset. For example, clustered file system manager 609 could update clustered file system metadata 611 to identify node 603 instead of fileset FS1.

At a stage D, fileset manager 615 requests Y free blocks. Fileset manager 615 requests free blocks from clustered file system manager 609 because fileset manager 615 will manage allocation of free blocks for clients writing to fileset FS1. A node can request free blocks with an indication of a number of blocks desired, which may be predefined. In some embodiments, a clustered file system manager provides the free blocks responsive to promoting or selecting a node to manage a fileset instead of waiting for a request. Embodiments can provision the free blocks to a fileset manager in accordance with various techniques. For example, a clustered file system manager can handle provisioning of free blocks to nodes differently for a node that is promoted to be a fileset manager than for a node that is already operating as a fileset manager. A node that already operates as a fileset manager may not be provisioned free blocks when delegated management of a new fileset. The clustered file system manager can assume that the fileset manager already has sufficient free blocks from the earlier promotion or from managing another fileset. But the fileset manager can be permitted to request additional free blocks. If fileset manager 615 requests free blocks, the fileset manager can request blocks by specifying a number of blocks. A fileset manager can also specify an amount of storage in bytes or bits. In some embodiments, free blocks are provisioned in default sets. For example, a node sends a request for free blocks without specifying a number. In response, the clustered file system manager provisions a set of blocks defined or configured as a default set.

Clustered file system manager 609 initially creates cluster free block map 613 based on cluster storage resources. Cluster free block map grows and shrinks based respectively on addition and removal of storage devices in the cluster. In the case of a cluster that delegates fileset management, the free block map maintained by the clustered file system manager can also shrink when blocks are provisioned to a fileset manager and can also grow when a fileset manager returns blocks to the clustered file system manager. To provision free blocks to fileset manager 615, clustered file system manager 609 removes Y blocks from cluster free block map 613 at stage E. To reflect the provisioning of Y blocks from cluster free block map 613, cluster free block map 613 is annotated with "0, (X−Y)." This annotation for ranges in this description indicates (starting offset, ending offset). Assuming cluster free block map 613 began with X+1 free blocks and that blocks are provisioned from an end of the series of blocks, the example annotation indicates a range of free blocks remaining in cluster free block map 613. At stage F, clustered file system manager 609 communicates the provisioned Y free blocks to fileset manager 615. In some embodiments, a clustered file system manager communicates provisioned free blocks and fileset metadata atomically. For example, the clustered file system manager can perform the provisioning of free blocks and delegation of a fileset to a node as a single transaction.

At stage G, fileset manager 615 creates or instantiates local free block map 617. Fileset manager 615 uses the local free block map to allocate free blocks to cluster clients operating on files in the fileset FS1. Local free block map 617 is annotated with "(X−Y+1, X)" to represent the end range of blocks that were provisioned from cluster storage. Fileset manager 615 can make requests for additional free blocks from clustered file system manager 609 if the free blocks in local free block map reach or fall below a low watermark or threshold. Embodiments may allow a fileset manager to continue requesting additional free blocks until a high watermark or free block ceiling is reached. Embodiments can also implement a clustered file system manager to provision a default number of free blocks to satisfy a free block ceiling threshold. Embodiments may also implement fileset managers to return blocks to the clustered file system manager if they exceed their free block ceiling.

Figure 7:
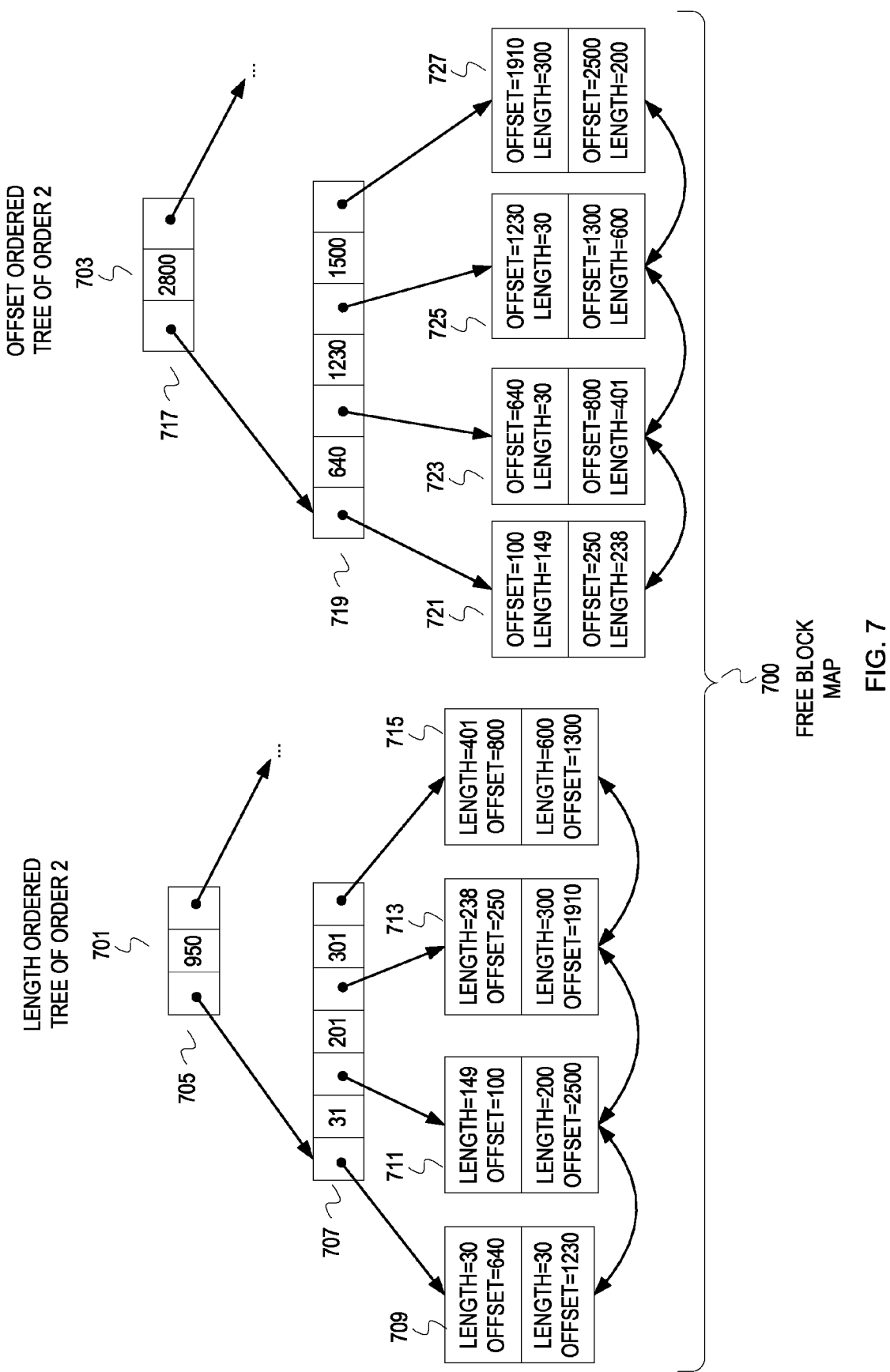
FIG. 7 depicts a conceptual diagram of a portion of an example free block map.

FIG. 7 depicts a conceptual diagram of a portion of an example free block map. Free block map 700 comprises two B+ trees: length ordered tree 701 and offset ordered tree 703. The trees are of order 2 in this example illustration. Being of order 2, the trees have at least 2 items per tree element (leaf element or interior element), and no more than 4 items per tree element. Tree 701 and tree 703 are synchronized. When a fileset manager or clustered file system manager provisions or allocates free blocks, the blocks are searched and selected from length ordered tree 701 in accordance with a length of size of the provisioning or allocating. And then offset ordered tree 703 is synchronized accordingly. When blocks are freed or returned to free block map 700, offset ordered tree 703 is first searched and updated, and then tree 701 is synchronized with tree 703.

The depicted portion of length ordered tree 701 includes root 705 with a single key 950. A left pointer of root element 705 resolves to interior tree element 707 having 3 keys: 31, 201, and 301. Since an extent that exceeds a request can be divided or "carved up," keys are selected that correspond to a largest number of blocks in a leaf element resolved by a pointer to the left of a key. In other words, if a leaf element can satisfy a request beyond Z blocks, then a key should be selected to drive a tree traversal for a request greater than Z blocks away from that leaf element. A right pointer of root element 705 resolves to a portion of length ordered tree 701 that is not depicted. The pointer left of key 31 resolves to leaf element 709 comprising two items. A first item indicates an extent of 30 blocks starting at offset 640. The second item indicates an extent of 30 blocks starting at offset/block 1230. A pointer between keys 31 and 201 resolves to leaf element 711. Leaf element 711 comprises two items. The first item indicates an extent of length 150 starting at offset 100. The second item indicates an extent of length 200 starting at offset 2500. A pointer between keys 201 and 301 resolves to leaf element 713. Leaf element 713 comprises a first item that indicates an extent of length 238 starting at offset 250. And a second item that indicates an extent of length 300 starting at offset 1910. A pointer right of key 301 resolves to leaf element 715. Leaf element 715 comprises a first item that indicates an extent of length 401 starting at offset 800. And a second item that indicates an extent of length 600 starting at offset 1300.

The depicted portion of offset ordered tree 703 includes root 717 with a single key 2800. A left pointer of root element 717 resolves to interior tree element 719 having 3 keys: 640, 1230, and 1500. A right pointer of root element 717 resolves to a portion of offset ordered tree 703 that is not depicted. The pointer left of key 640 resolves to leaf element 721 comprising two items. A first item indicates the extent starting at offset 100 having a length of 149. The second item indicates the extent starting at offset 250 having a length of 238. A pointer between keys 640 and 1230 resolves to leaf element 723. Leaf element 723 comprises two items. The first item indicates the extent starting at offset 640 and having a length of 30. The second item indicates the extent starting at offset 800 and having a length of 401. A pointer between keys 1230 and 1500 resolves to leaf element 725. Leaf element 725 comprises a first item that indicates the extent starting at offset 1230 with a length of 30. And a second item that indicates the extent starting at offset 1300 with a length of 600. A pointer right of key 1500 resolves to leaf element 727. Leaf element 727 comprises a first item that indicates the extent starting at offset 1910 with a length of 300. And a second item that indicates the extent starting at offset 2500 with a length of 200. Although not necessary, leaf elements of tree 701 are depicted as doubly linked, and leaf elements of tree 703 are depicted as doubly linked.

To illustrate provisioning of free blocks from cluster free block map 613, assume free block map 700 is the cluster free block map 613. When clustered file system manager 609 provisions blocks to fileset manager 615, 600 blocks are requested by fileset manager 615, for example. Clustered file system manager 609 searches length ordered tree 701 for an extent of at least 600 blocks. Clustered file system manager 609 resolves the left pointer of root element 705 because 600 is less than key 950. Clustered file system manager 609 then resolves the pointer right of key 301 because 600 is greater than key 301 and key 301 is the last key. Clustered file system manager 609 resolves the pointer to leaf element 715. The first item represents an extent of only 401 blocks, which is not sufficient for the provisioning. Clustered file system manager 609 then selects the second item. Since the second item, which indicates an extent of length 600, can satisfy the provisioning to fileset manager 615, leaf element 715 is removed from length ordered tree 701. The second item representing the extent of length 600 starting at offset 1300 is removed, and the first item of leaf element 715 is inserted back into tree 701.

To synchronize trees, clustered file system manager 609 then searches offset ordered tree 703 for the extent being provisioned, which starts at offset 1300. The clustered file system manager 609 resolves the left pointer of root element 717 because offset 1300 is less than key 2800. Clustered file system manager then resolves the pointer to the left of key 1500 to leaf element 725 because offset 1300 is less than key 1500. Leaf element 725 is then removed from offset ordered tree 703. The first item of leaf element 725, which indicates the extent starting at offset 1230, is reinserted back into offset ordered tree 703. Now the extent of length 600 starting at offset 1300 has been removed from both trees.

For another illustration, assume a cluster client requests an extent of length 100 from fileset manager 615. Fileset manager 615 allocates free blocks from local free block map 617. For this illustration, assume free block map 700 represents local free block map 617. Fileset manager 615 searches for an extent of length 100 in length ordered tree 701. Fileset manager 615 resolves the left pointer of root element 705 because 100 is less than key 950. Fileset manager 615 then resolves the pointer left of key 201 because 100 is less than key 201. Fileset manager 615 resolves the pointer to leaf element 711. The first item represents an extent of 149 blocks, which is sufficient for the allocation. Fileset manager 615 then removes leaf element 715 from length ordered tree 701. The first item representing the extent of length 150 starting at offset 100 is modified to use 100 of the 149 blocks. The remainder of the extent and the extent represented by the second item of leaf element 711 is inserted back into tree 701. The remainder extent can be an extent of length 49 blocks starting at offset 100 or an extent of length 49 blocks starting at offset 200.

To synchronize trees, fileset manager 615 then searches offset ordered tree 703 for the extent being provisioned, which starts at offset 100. Fileset manager 615 resolves the left pointer of root element 717 because offset 100 is less than key 2800. Fileset manager 615 then resolves the pointer to the left of key 640 to leaf element 721 because offset 100 is less than key 640. The offset 100 is found in the first item of leaf 721. Leaf element 721 is then removed from offset ordered tree 703. The second item of leaf element 721, which indicates the extent starting at offset 250, is reinserted back into offset ordered tree 703. A remainder extent starting at offset 200 is also inserted into offset ordered tree 703. In this particular example, a leaf element can be added to tree 203 with the first item indicating the extent starting at offset 200 of length 50, and with the second item of leaf element 721. Now the extent of length 100 starting at offset 100 has been removed from both trees.

Although various forms of the term "provisioning" are used to describe providing free blocks to a fileset manager and various forms of the term "allocating" are used to describe providing free blocks to a cluster client, the operations are similar. The different terms are used distinguish the operations because of the state of the blocks. Blocks provisioned from a cluster free block map to a fileset manager remain free even as indicated by a local free block map, but are considered consumed from the perspective of the clustered file system manager. Blocks allocated to a cluster client are no longer free.

Figure 8:
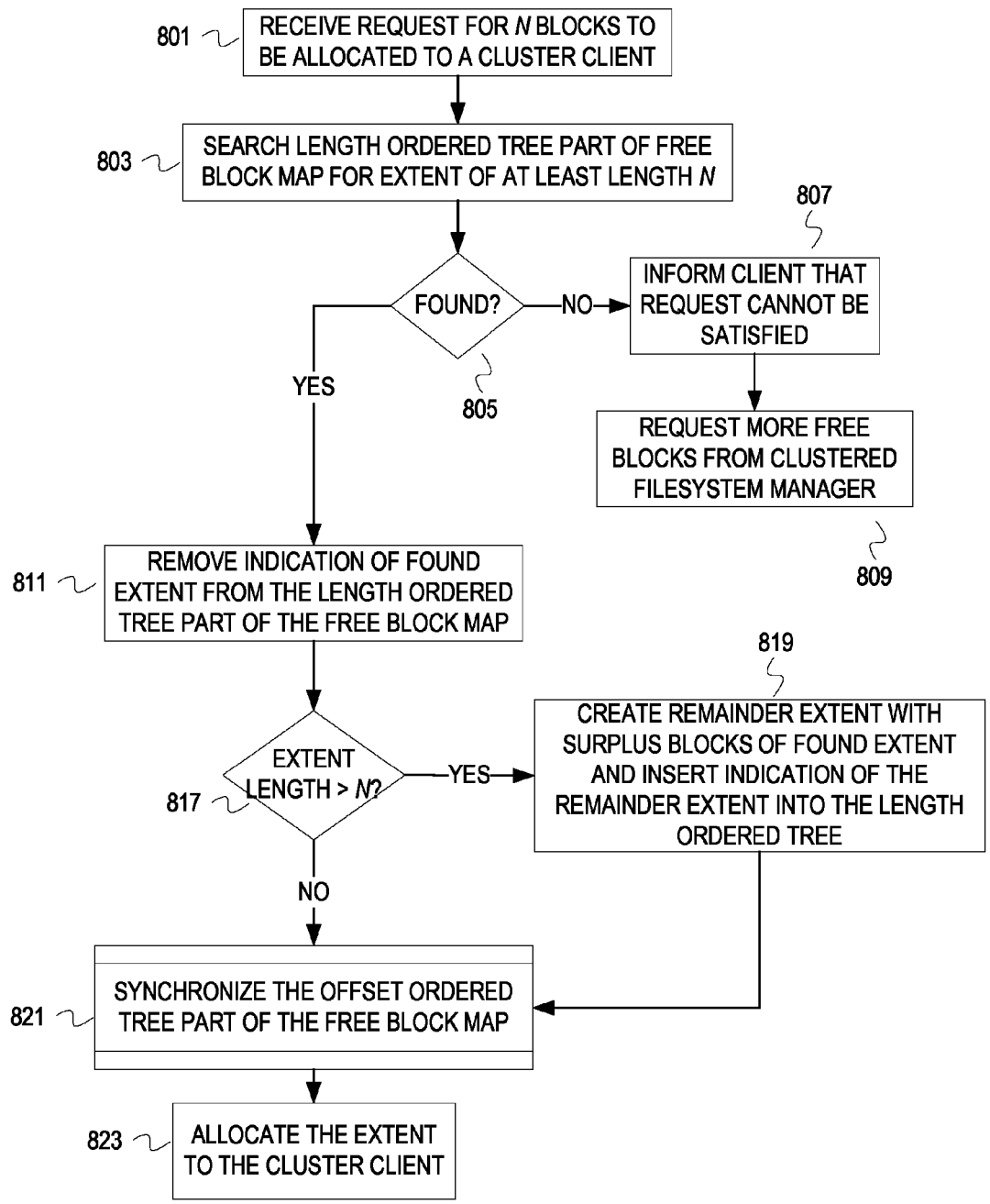
FIGS. 8-10 depict flowcharts of example operations of modifying a free block map for allocating/provisioning free blocks and returning free blocks to a free block map.
Figure 9:
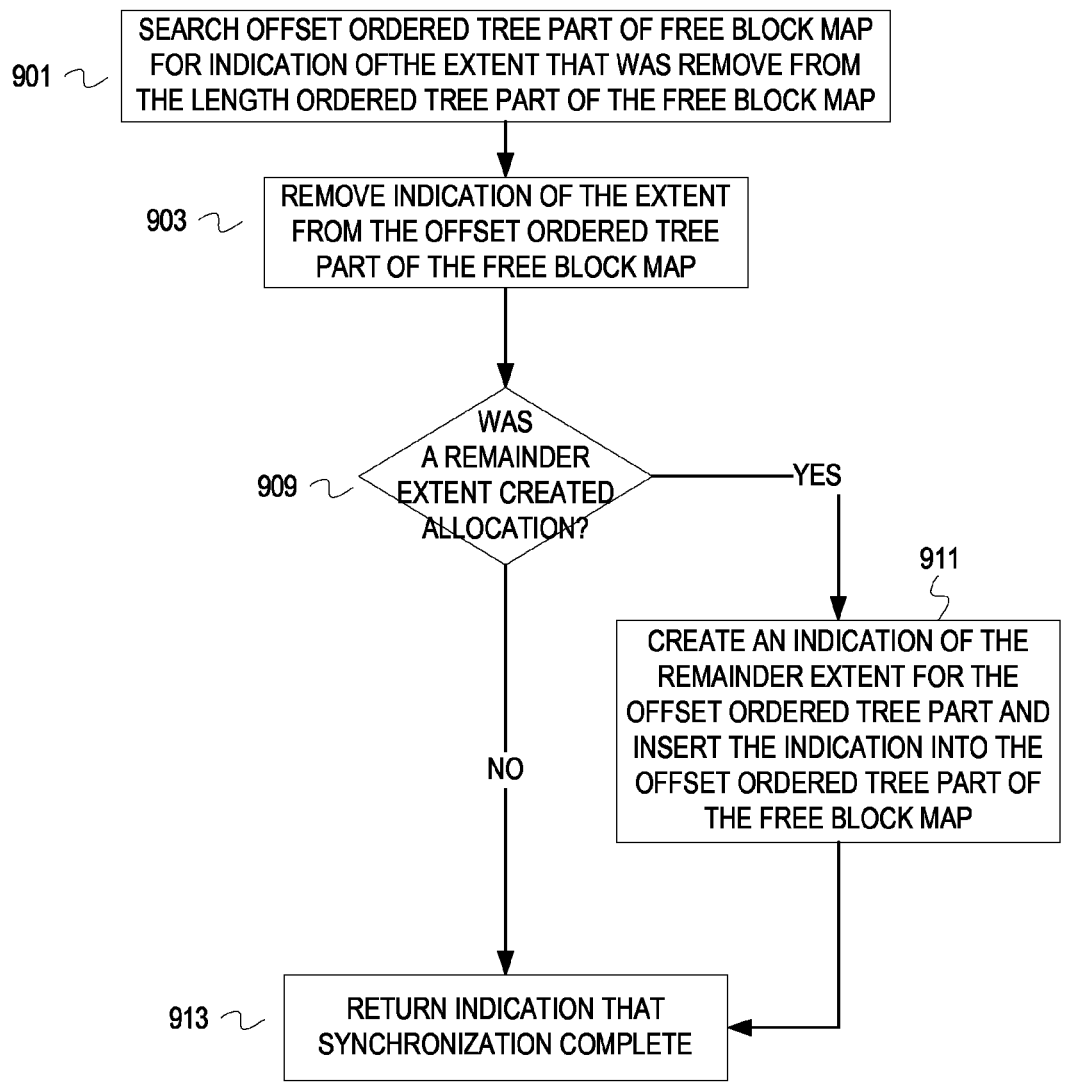
Figure 10:
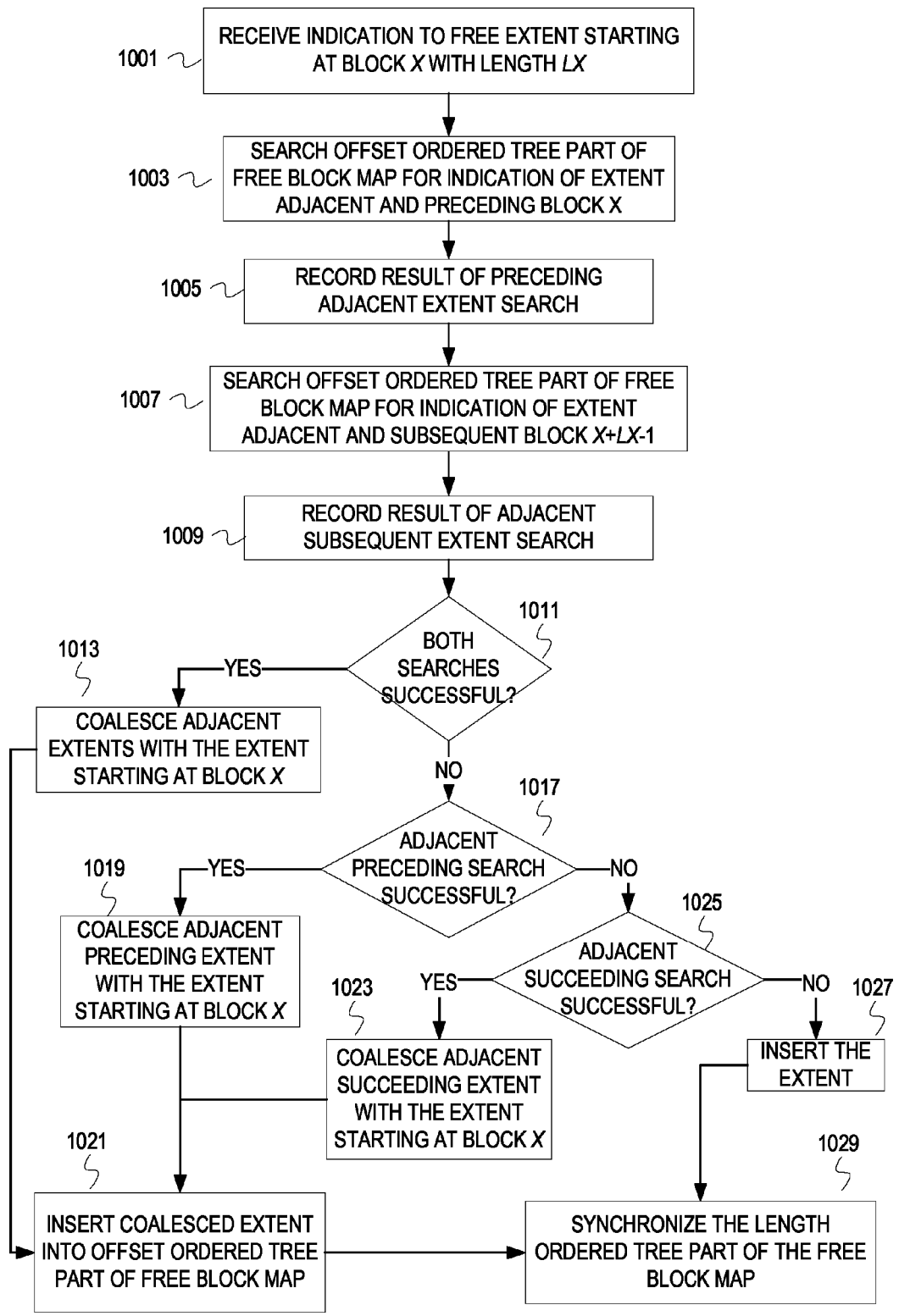

FIGS. 8-10 depict flowcharts of example operations of modifying a free block map for allocating/provisioning free blocks and returning free blocks to a free block map. FIG. 8 depicts a flowchart of example operations for allocating free blocks from a free block map. A cluster client submits a request to a fileset manager for N blocks of cluster storage. The fileset manager receives the request for N blocks to be allocated to the cluster client (801). The fileset manager searches the length ordered tree part of a local free block map for an extent of at least N blocks in length (803).

If an indication of an extent of at least N blocks is not found (805), then the fileset manager informs the cluster client that the request cannot be satisfied (807). The fileset manager also requests more free blocks from a clustered file system manager (809). Embodiments can first attempt to obtain additional free blocks from a clustered file system manager before deciding that a request cannot be fulfilled. In that case, the fileset manager can refrain from informing a cluster client that their request cannot be fulfilled unless the clustered file system manager cannot provision additional free blocks to the fileset manager.

If an indication of an extent of at least N blocks is found (805), the fileset manager removes the found indication of the extent from the length ordered tree part of the local free block map (811). For example, an executing instance of fileset manager code calls a function of B+ tree code, which handles tree specific operations (e.g., insert, delete, balance, etc.). The B+ tree code performs operations to remove the indication of the extent and rebalance the length ordered tree part of the free block map.

The fileset manager then determines if the extent has a length greater than N blocks (817). If the extent has a length greater than N blocks, then the fileset manager allocates the N blocks from the extent to the cluster client and creates an indication of the remainder of the extent ("remainder extent") with the surplus or leftover (819). The indication of the remainder extent is then inserted into the length ordered tree part of the local free block map (819). For example, the fileset manager calls an insert value function of the B+ tree code (e.g., a B+ tree library function).

Since the length ordered tree part of the local free block map has been modified, the offset ordered tree part of the local free block map is synchronized accordingly (821). The extent is then allocated to the cluster client (823). For example, the fileset manager transmits a message the indication of the extent to the requesting cluster client.

FIG. 9 depicts a flowchart of example operations for synchronizing an offset ordered tree part of a local free block map with the modified length ordered tree part of the local free block map. After extracting an extent (or part of an extent) from the length ordered tree part of the local free block map, the fileset manager searches an offset ordered tree part of the local free block map based on the offset of the extracted extent (901). Since the two trees of the local free block map are synchronized, the offset should be found. The fileset manager removes an indication of the extent from the offset ordered tree part of the free block map (903).

The fileset manager then determines if a remainder extent was created (909). In other words, the fileset manager determines if the extent selected from the length ordered tree had more than N blocks. For example, a function to synchronize the offset ordered tree can be invoked and a parameter for a remainder extent passed in the function call to implicitly indicate that an extent was carved up or divided. If the extent was carved up, then the fileset manager creates an indication of the remainder extent for the offset ordered tree part of the free block map (911). The fileset manager then inserts the indication of the remainder extent into the offset ordered tree part of the local free block map (911). Embodiments can employ different data structures for the elements of the different ordered trees or the same data structure. Thus, a fileset manager can instantiate different data structures that indicate a same extent for insertion into the differently ordered trees in some embodiments. In some embodiments, the fileset manager can instantiate one data structure that indicates the extent to be inserted, and pass the instantiated data structure into the two different function calls for the two differently sorted trees.

An indication is returned that the synchronization is complete (913). The indication allows the allocation of the free blocks to the cluster client to complete. For example, a synchronization method or function can return an indication that allows allocation to proceed (i.e., the extent to be communicated to the requesting cluster client).

FIG. 10 depicts a flowchart of example operations for returning blocks to a free block map. A fileset manager receives an indication to free an extent starting at block X with length LX (1001). The fileset manager searches the offset ordered tree part of the free block map for an indication of an extent adjacent to the to-be freed extent and preceding block X (1003). A result of the search for the preceding adjacent extent is recorded (1005). For example, a function invoked to perform the preceding adjacent extent search extracts the indication of the preceding adjacent extent and then a flag is set to indicate success. Embodiments can also indicate success in accordance with other techniques. For example, embodiments can implicitly indicate success by setting a null pointer to reference the indication of the preceding adjacent extent instead of a null value.

The fileset manager also searches the offset ordered tree part of the free block map for an indication of an extent adjacent to the to-be freed extent and subsequent to block X+LX−1 (1007). A result of the search for the subsequent adjacent extent is recorded (1009). For example, a function invoked to perform the subsequent adjacent extent search extracts the indication of the subsequent adjacent extent and a flag is set to indicate success. Embodiments can also indicate success in accordance with other techniques. As with the preceding adjacent extent, embodiments can implicitly indicate success by setting a null pointer to reference the extracted leaf element instead of a null value.

The fileset manager then uses the recorded results to determine if both searches were successful (1011). If both searches were successful, then the fileset manager coalesces the adjacent extents with the extent starting at block X (1013). Assuming the preceding adjacent extent began at block A with a length of LA and the subsequent adjacent extent has a length LB, the coalesced extent starts at block A and has a length of LB+LX+LA.

The fileset manager may determine that only a preceding adjacent extent was found (1017). If a preceding adjacent extent was found but a subsequent adjacent extent was not found, then the fileset manager coalesces the preceding adjacent extent with the extent starting at block X (1019). The coalesced extent would start at block A and have a length of LA+LX.

If the recorded search results indicate that only a subsequent adjacent extent was found (1025), then the fileset manager coalesces the subsequent adjacent extent with the extent starting at block X (1023). The coalesced extent would start at block X and have a length of LB+LX.

If no adjacent extents were found, then the fileset manager inserts the extent starting at block X into the offset ordered tree part of the free block map (1027). For example, the fileset manager invokes a B+ tree insert function with an indication of the extent passed as a parameter. If extents were coalesced, then the coalesced extent is inserted into the offset ordered tree part of the free block map.

The depicted flowcharts are examples intended to aid in understanding the inventive subject matter, and should not be used to limit embodiments and/or the scope of the claims. Embodiments can perform the operations depicted in the flowcharts in a different order, can perform the depicted operations in parallel, can perform additional operations, can perform fewer operations, etc. Referring to FIG. 5, embodiments can preserve client identifiers with the in-flight blocks and avoid returning all in-flight blocks to the free state. But some in-flight blocks may still have to be returned to the free state if a client that was allocated in-flight blocks failed also. Also, a succeeding server may wait to notify a cluster of a change in responsibility for a fileset (505) until after the succeeding server attempts to recover blocks for cluster clients (515, 517).

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 11:
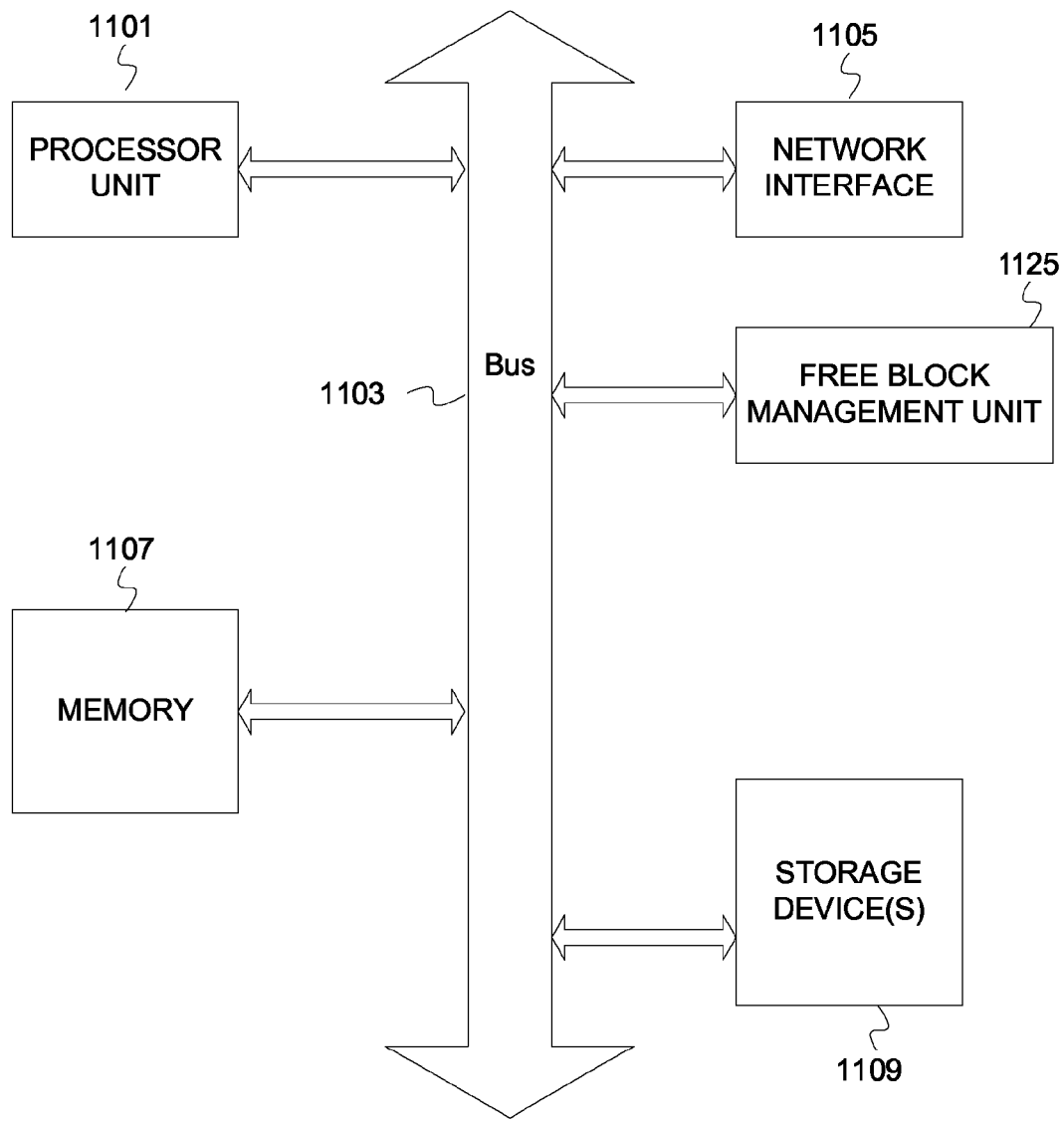
FIG. 11 depicts an example computer system.

FIG. 11 depicts an example computer system. A computer system includes a processor unit 1101 (possibly including multiple processors, multiple cores, multiple nodes, and/or implementing multi-threading, etc.). The computer system includes memory 1107. The memory 1107 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media.

The computer system also includes a bus 1103 (e.g., PCI, ISA, PCI-Express, HyperTransport®, InfiniBand®, NuBus, etc.), a network interface 1105 (e.g., an ATM interface, an Ethernet interface, a Frame Relay interface, SONET interface, wireless interface, etc.), and a storage device(s) 1109 (e.g., optical storage, magnetic storage, etc.). The computer system also comprises a free block management unit 1125. Free block management unit 1125 manages an in-flight block map and a free block map for a cluster server (e.g., a fileset manager or a clustered file system manager). Free block management unit 1125 allocates or provisions free blocks from the free block map, tracks in-flight blocks with the in-flight block map, and at least partially restores the in-flight block after a failure in a server and/or client. Free block management unit 1125 returns blocks to the free block map when released (e.g., from an old consistency snapshot or when restoring an in-flight block map). Any one of these functionalities may be partially (or entirely) implemented in hardware and/or on the processing unit 1101. For example, the functionality may be implemented with an application specific integrated circuit, in logic implemented in the processing unit 1101, in a co-processor on a peripheral device or card, etc. Further, realizations may include fewer or additional components not illustrated in FIG. 11 (e.g., video cards, audio cards, additional network interfaces, peripheral devices, etc.). The processor unit 1101, the storage device(s) 1109, and the network interface 1105 are coupled to the bus 1103. Although illustrated as being coupled to the bus 1103, the memory 1107 may be coupled to the processor unit 1101.

While the embodiments are described with reference to various implementations and exploitations, it will be understood that these embodiments are illustrative and that the scope of the inventive subject matter is not limited to them. In general, techniques for managing free blocks in a centralized or distributed cluster as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer program product for allocating cluster storage units to cluster nodes for a clustered file system that implements redirect-on-write snapshotting, the computer program product comprising:
 a computer readable storage medium having program instructions embodied therewith, the program instructions comprising program instructions to,
  track cluster storage units for a clustered file system of a cluster that implements redirect-on-write snapshotting as free, in-flight, or committed, wherein the cluster storage units comprise logical units of aggregate storage space of storage devices of the cluster;

indicate a first set of the cluster storage units as free because the first set of cluster storage units are available for allocation to nodes of the cluster;

receive a request for cluster storage units from a client node;

in response to reception of the request for cluster storage units from the client node,
transition the first set of the cluster storage units from free to in-flight to represent that the first set of cluster storage units are allocated to the client node for the client node to write to the first set of the cluster storage units; and
send first indications of the first set of the cluster storage units to the client node, receive, from the client node, second indications of the first set of the cluster storage units, checksums corresponding to the first set of the cluster storage units, and an indication of a fileset, wherein reception of the second indications of the first set of the cluster storage units and the checksums corresponding to the first set of the cluster storage unit indicates that the client node has written data to the first set of the cluster storage units;

in response to reception of, from the client node, the second indications of the first set of the cluster storage units and checksums corresponding to the first set of the cluster storage units, write the second indications of the first set of the cluster storage units and the checksums corresponding to the first set of the cluster storage units to a location in metadata for the clustered file system corresponding to the fileset;

if a failure does not interrupt a writing of the indications of the first set of the cluster storage units and the checksums corresponding to the first set of the cluster storage units to a location in metadata for the clustered file system corresponding to the fileset, then transition the first set of the cluster storage units to committed; and if a failure interrupts a writing of the indications of the first set of the cluster storage units and the checksums corresponding to the first set of the cluster storage units to a location in metadata for the clustered file system corresponding to the fileset, then return the first set of the cluster storage units to free.

2. The computer program product of claim 1, wherein said program instructions to indicate the first set of the cluster storage units as free comprises program instructions to represent the first set of the cluster storage units in a first structure that comprises information that identifies those of the cluster storage units that are available for allocation to nodes.

3. The computer program product of claim 2, wherein said program instructions to transition the first set of the cluster storage units from free to in-flight comprises program instructions to:
remove information that identifies the first set of the cluster storage units from the first structure; and
add the information that identifies the first set of the cluster storage units to a second structure that comprises information that identifies those of the cluster storage units that have been allocated to nodes for writing.

4. The computer program product of claim 3, wherein said program instructions to transition the first set of the cluster storage units to committed comprises program instructions to:
remove the information that identifies the first set of the cluster storage units from the second structure; and
record the checksums into the metadata for the clustered file system, wherein the client node generated and communicated the checksums.

5. The computer program product of claim 1, wherein the program instructions further comprise program instructions to:
detect a failure at the client node before at least one of the client node writes the data to the cluster storage units, the data written to the cluster storage units by the client node are visible to the cluster, and updating of the metadata with the checksums completes,
wherein said program instructions to return the first set of the cluster storage units to free comprises program instructions to:
remove information that identifies the first set of the cluster storage units from a first structure that comprises information that identifies those of the cluster storage units that have been allocated; and
update a second structure with the information that identifies the first set of the cluster storage units, wherein the second structure comprises information that identifies those of the cluster storage units that are available for allocation.

6. The computer program product of claim 1, wherein the program instructions further comprise program instructions to:
detect that a first server node that managed a first fileset of the clustered file system failed, wherein the computer is delegated management responsibility for the first fileset in response to the failure of the first server node;
load free cluster storage unit data stored to the aggregate storage space by the first server node, wherein the free cluster storage unit data indicates those of the cluster storage units that were free before the first server node failed;
load in-flight cluster storage unit data stored to the aggregate storage space by the first server node, wherein the in-flight cluster storage unit data indicates those of the cluster storage units that were in-flight before the first server node failed;
return those of the cluster storage units indicated as in-flight by the in-flight cluster storage unit data to free;
query client nodes of the cluster to determine those of the cluster storage units considered in-flight by the client nodes; and
transition those of the cluster storage units considered as in-flight by the client nodes from free to in-flight based on responses from the client nodes.

7. A computer program product for allocating cluster storage units to cluster nodes for a clustered file system that implements redirect-on-write snapshotting, the computer program product comprising:
a computer readable storage medium having program instructions embodied therewith, the program instructions comprising program instructions to,
receive a request for a number of cluster storage units from a client node in a cluster that implements redirect-on-write snapshotting for a clustered file system;
in response to reception of the request for the number of cluster storage units from the client node in the cluster that implements redirect-on-write snapshotting for a clustered file system, determine a set of cluster storage units that are free and that satisfy the number of cluster storage units;
indicate the set of cluster storage units as allocated to the client node and no longer free;

allocate the set of cluster storage units to the client node;
send first indications of the set of the cluster storage units to the client node;
receive a plurality of checksums and second indications of the set of cluster storage units from the client node, wherein the client node writes data to the set of cluster storage units and generates the plurality of checksums for the data; and
in response to reception of the plurality of checksums and the second indications of the set of cluster storage units from the client node,
update metadata for the clustered file system to indicate the plurality of checksums for the data written to the set of cluster storage units; and
update the metadata for the clustered file system to indicate an association between a fileset and the second indications of the set of cluster storage units.

8. The computer program product of claim 7, wherein the program instructions further comprise program instructions to remove an indication that the set of cluster storage units are allocated if an operation to update the metadata for the clustered file system completes successfully.

9. The computer program product of claim 8, wherein said program instructions to remove an indication that the set of cluster storage units are allocated comprises program instructions to remove data that identifies the set of cluster storage units from a structure that indicates cluster storage units allocated to nodes for the nodes to write.

10. The computer program product of claim 7, wherein said program instructions to indicate the set of cluster storage units as allocated to the client node and no longer free comprises program instructions to:
remove data that identifies the set of cluster storage units from a first structure that indicates cluster storage units available for allocation to nodes of the cluster; and
insert the data into a second structure that indicates cluster storage units allocated to nodes.

11. An apparatus comprising:
a processor;
a network interface configured to transmit and receive data to nodes of a cluster; and
a computer readable storage medium coupled with the processor, the computer readable storage medium having computer usable program code embodied therewith, the computer usable program code, which, when executed by the processor, cause the apparatus to,
track cluster storage blocks for a clustered file system of the cluster that implements redirect-on-write snapshotting as free, in-flight, or committed, wherein the cluster storage blocks comprise logical units of aggregate storage space of storage devices of the cluster;
indicate a first set of the cluster storage blocks as free because the first set of cluster storage blocks are available for allocation to nodes of the cluster;
receive a request for cluster storage units from a client node;
in response to reception of the request for cluster storage units from the client node, transition the first set of the cluster storage blocks from free to in-flight to represent that the first set of cluster storage blocks are allocated to the client node for the client node to write to the first set of the cluster storage blocks; and
send first indications of the first set of the cluster storage units to the client node;
receive, from the client node, second indications of the first set of the cluster storage units, checksums corresponding to the first set of the cluster storage units, and an indication of a fileset, wherein receiving the second indications of the first set of the cluster storage units and the checksums corresponding to the first set of the cluster storage unit indicates that the client node has written data to the first set of the cluster storage units;
in response to reception, from the client node, of the second indications of the first set of the cluster storage units and checksums corresponding to the first set of the cluster storage units, write the second indications of the first set of the cluster storage units and the checksums corresponding to the first set of the cluster storage units to a location in metadata for the clustered file system corresponding to the fileset;
if a failure does not interrupt a writing of the indications of the first set of the cluster storage units and the checksums corresponding to the first set of the cluster storage units to a location in metadata for the clustered file system corresponding to the fileset, then transition the first set of the cluster storage blocks to committed; and
if a failure interrupts a writing of the indications of the first set of the cluster storage units and the checksums corresponding to the first set of the cluster storage units to a location in metadata for the clustered file system corresponding to the fileset, then return the first set of the cluster storage blocks to free.

12. The apparatus of claim 11, wherein the computer usable program code which, when executed by the processor, further causes the apparatus to:
detect that a first server node that managed a first fileset of the clustered file system failed, wherein the apparatus is delegated management responsibility for the first fileset in response to the failure of the first server node;
load free cluster storage unit data stored to the aggregate storage space by the first server node, wherein the free cluster storage unit data indicates those of the cluster storage units that were free before the first server node failed;
load in-flight cluster storage unit data stored to the aggregate storage space by the first server node, wherein the in-flight cluster storage unit data indicates those of the cluster storage units that were in-flight before the first server node failed;
return those of the cluster storage units indicated as in-flight by the in-flight cluster storage unit data to free;
query client nodes of the cluster to determine those of the cluster storage units considered in-flight by the client nodes; and
transition those of the cluster storage units considered as in-flight by the client nodes from free to in-flight based on responses from the client nodes.

* * * * *